United States Patent [19]

Starcevic

[11] 4,012,654
[45] Mar. 15, 1977

[54] SINGLE-PHASE SYNCHRONOUS MACHINE

[75] Inventor: Mihailo Starcevic, Mellingen, Switzerland

[73] Assignee: BBC Brown Boveri & Company Limited, Baden, Switzerland

[22] Filed: June 4, 1974

[21] Appl. No.: 476,221

Related U.S. Application Data

[63] Continuation of Ser. No. 314,576, Dec. 13, 1972, abandoned.

[30] Foreign Application Priority Data

Dec. 24, 1971 Switzerland .................. 18902/71

[52] U.S. Cl. .............................. 310/258; 310/51; 310/91
[51] Int. Cl.² ........................................ H02K 1/12
[58] Field of Search .................. 310/51, 91, 258; 248/15, 26

[56] References Cited

UNITED STATES PATENTS

| 2,217,788 | 10/1940 | Blake | 310/258 X |
| 2,424,299 | 7/1947 | Baudry et al. | 310/258 |
| 2,554,226 | 5/1951 | Taylor | 310/51 UX |
| 2,561,994 | 7/1951 | Rashevsky et al. | 310/51 UX |

Primary Examiner—Mark O. Budd
Attorney, Agent, or Firm—Pierce, Scheffler & Parker

[57] ABSTRACT

A resilient structure for mounting the stator component of a synchronous electrical machine on its baseplate includes a plurality of spring brackets interconnecting respective points of attachment on the periphery of the stator component with the baseplate and which extend in radial planes as related to the stator axis. Each spring bracket includes at least one leaf spring the ends of which are held in spring retainers incorporating ribs disposed in the plane of the spring flexure. The ribs at opposite ends of the spring are rigidly fixed respectively to the stator and baseplate and the one or more leaf springs utilized in each mounting bracket are statically stressed only in tension by the weight of the stator component and are subjected to a dynamic bending stress in response to torsional vibrations occurring in the stator and which are absorbed by the springs which are softer in the peripheral direction than in the radial and axial directions. The spring bracket type of mounting structure is equally applicable to synchronous machines wherein the rotor turns on a horizontal axis as well as to those wherein the rotor turns on a vertical axis.

3 Claims, 5 Drawing Figures

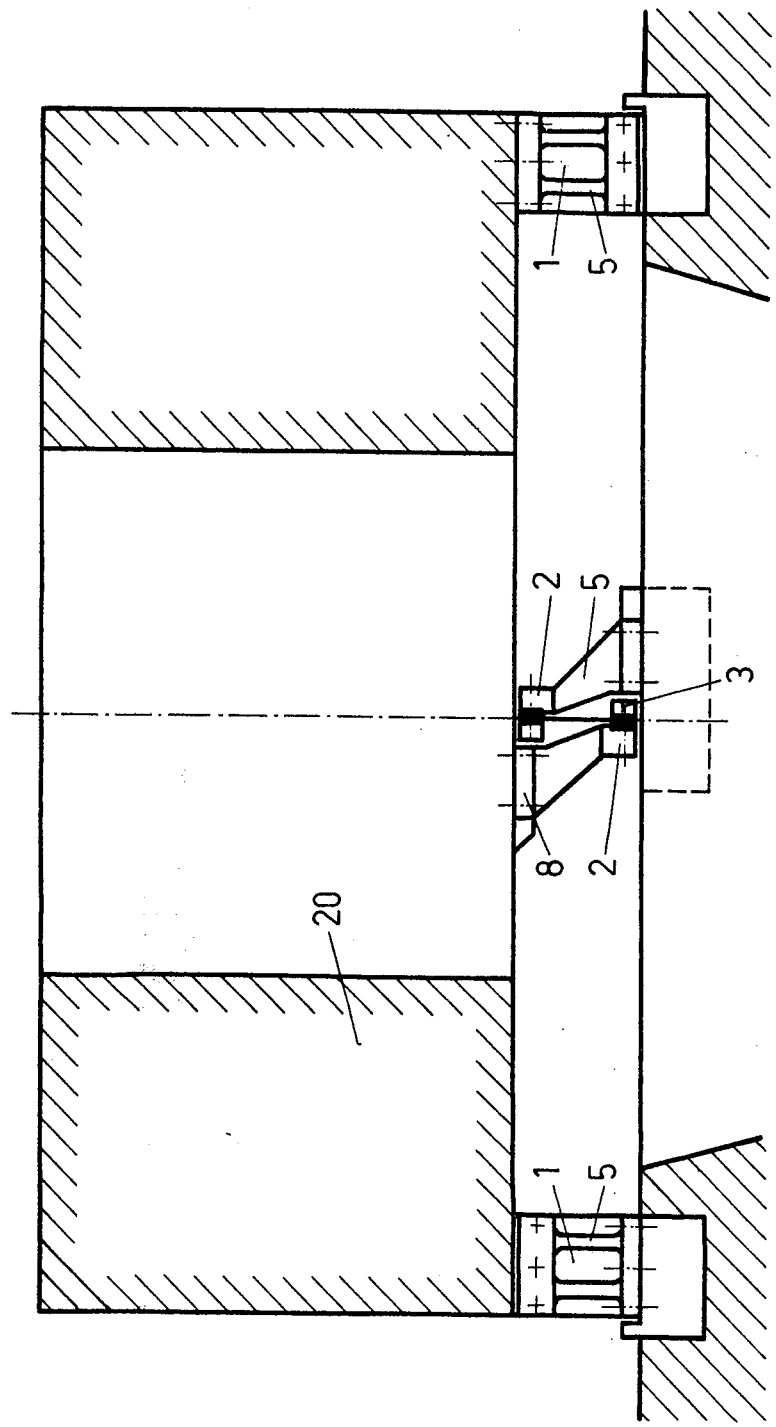

SINGLE-PHASE SYNCHRONOUS MACHINE

This is a continuation, of application Ser. No. 314,576 filed Dec. 13, 1972, now abandoned.

This invention concerns a synchronous machine, in particular a single-phase machine, the stator of which is supported on a resilient mounting.

With single-phase synchronous machines the stator has to be on a flexible mounting so that it can oscillate freely under normal operating conditions, and only a fraction of the pulsating torque is transmitted to the foundation. It is particularly important, however, that the stator is able to oscillate freely in the event of a short circuit across the terminals, as only in this way is it possible to reduce the forces acting on the foundation.

In connection with horizontal single-phase synchronous machines, a known method of suspending the stator consists in fitting coil springs which are attached laterally to the stator and linked with the foundation.

With this form of spring suspension, where the springs provide support only in the peripheral direction, the forces occurring in the case of a terminal short circuit are absorbed without difficulty. Because the springs are soft in all other directions, however, the stator has to be provided with guiding devices which require maintenance and are subject to wear. Also, radial stops are necessary to prevent the stator from striking the rotor, which is supported independently. These radial stops transmit radial forces to the foundation in the form of tensile or compressive forces. At standstill, when the whole weight of the stator is carried by the spring assemblies, these springs are already under heavy load.

In the case of vertical single-phase synchronous machines a known method of mounting the stator is to support it independently of the rotor in such way that it can oscillate freely in the peripheral direction in order to prevent forces acting in the peripheral direction, which occur during normal operation and in the event of short circuits, from being transmitted to the foundation. In this case the stator is supported on the foundation, by way of springs or resilient elements which are located at the outer periphery of the stator and allow it to move in the peripheral direction. These elements take up a lot of space and also cause the walls enclosing the stator to be heavily stressed by the transmitted forces. A further possibility is to support the stator on leaf springs which allow deflection and are firmly fixed to both the stator and the foundation. With this kind of resilient mounting, however, there is a danger that the leaf springs will buckle, and therefore stops have to be provided which limit deflection of the leaf springs, and hence also the movement of the stator in the peripheral direction. The result of this is that, if a short circuit occurs, high, shock-like stresses are transmitted to the foundation and the stops become deformed or damaged. Also, thermal expansion occurring in the stator imposes an additional radial load on the spring assemblies.

The object of the invention is to create a method of suspending the stator of a synchronous machine which is much simpler and less costly than previous methods, and allows the stator to oscillate freely under all operating conditions.

This object is achieved in that the stator is supported by way of a plurality of spring brackets interconnecting the stator and a base plate. Each spring bracket includes one set of parallel stiffening ribs projecting from the stator in the direction towards but terminating short of the base plate in a spring-connection end, a second set of parallel spaced stiffening ribs projecting from the base plate in the direction towards but terminating short of the stator in a spring-connecting end and a leaf spring extending in a direction radially of the stator axis and which is connected at the opposite ends thereof to the spring-connecting ends of the two sets of stiffening ribs. The leaf springs are stressed only in tension under static conditions by the weight of the stator and are subjected to dynamic bending stresses in response to torsional vibration occurring in the stator during operation of the machine, these bending stresses being transmitted to the springs through the stiffening ribs which lie in the plane of flexure of the springs. The stiffening ribs also serve to stiffen the spring brackets in the radial and axial directions of the stator.

The principal advantages achieved with the invention are that the same spring suspension can be used for horizontal and vertical machines, and the spring suspension scarcely adds to the space required by the machine. Also, the suspension requires no maintenance.

Some examples of the invention will now be explained in more detail, with reference to the accompanying drawings, in which:

FIG. 5 is the stator of a vertical-axis machine with the suspension of the invention.

Figures 1, 2:
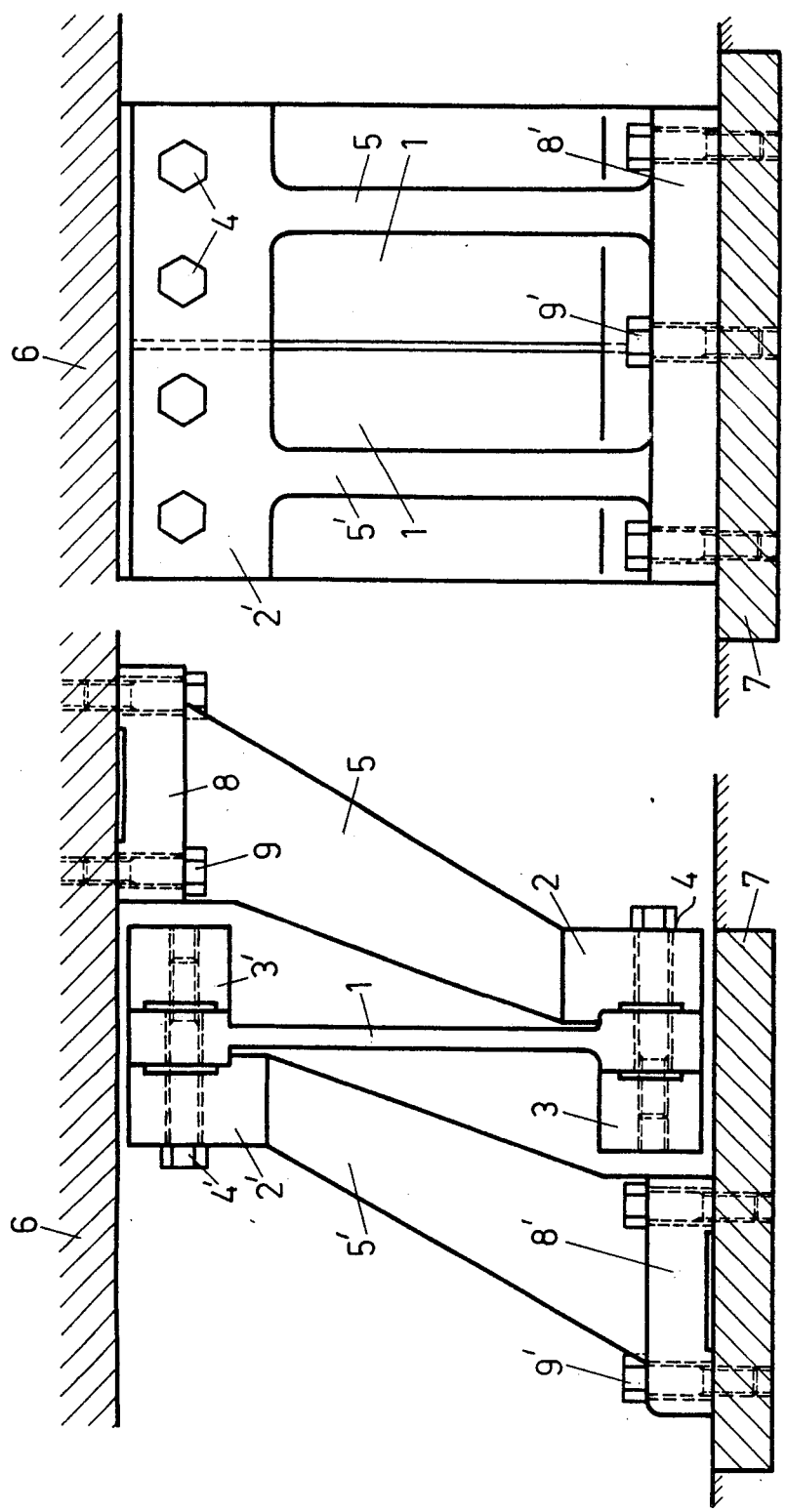
FIG. 1 shows a spring bracket vertical to the plane of flexure of the spring.
FIG. 2 is a view of the same spring bracket in the plane of flexure of the spring.
Figure 3:
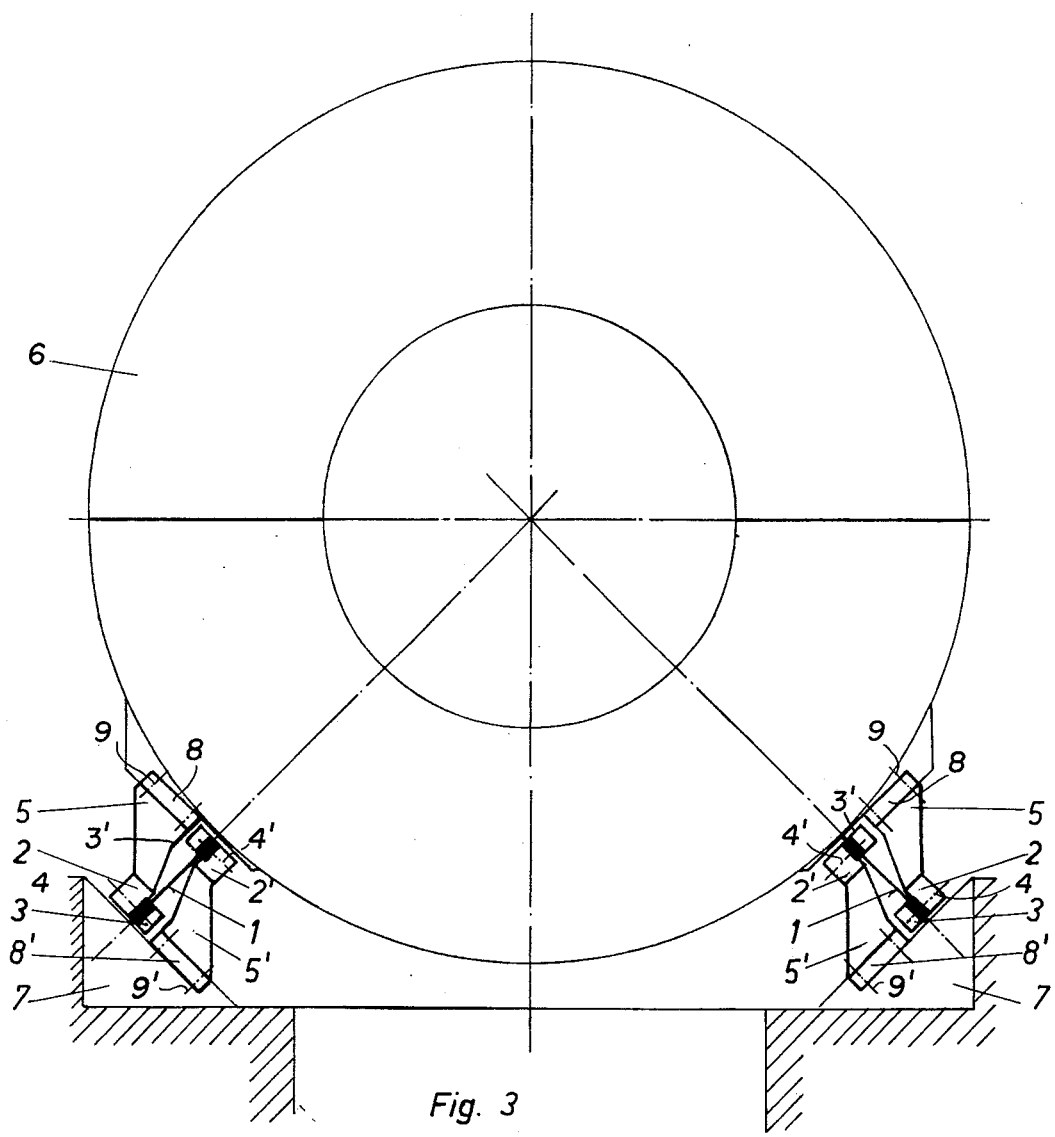
FIG. 3 shows schematically the stator of a horizontal machine with the suspension of the invention.
Figure 4:
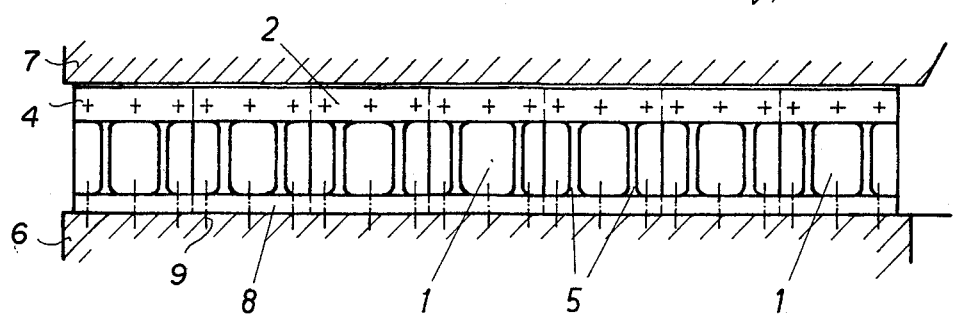
FIG. 4 is a multiple spring bracket for this machine.

The spring bracket structure shown at a comparatively large scale in FIGS. 1 and 2 and at a much smaller scale in FIGS. 3 and 4 as applied to the stator of a horizontal machine comprises one set of parallel stiffening ribs 5 projecting from the stator 6 in the direction towards but terminating short of a base plate 7 in a spring-connecting end structure 2. At the side of the stator, the ribs 5 terminate in a bar 8 extending longitudinally of the stator and which is secured to the stator by means of bolts 9. A second and similar set of parallel spaced stiffening ribs 5' project from the base plate 7 in the direction towards but terminate short of the stator 6 in a spring-connecting end structure 2'. At the side of the base plate 7, the ribs 5' terminate in a bar 8' extending longitudinally of the stator and which is secured to the base plate 7 by means of bolts 9'. The bars 8,8' are preferably permanently attached to the ribs 5,5' by welding. It is also possible to omit the bars 8,8' and attach the ribs 5,5' directly to the stator 6 or baseplate 7. Each leaf spring 1 which extends in a direction radially of the stator axis is connected at the opposite ends thereof to the spring-connecting end structures 2 and 2' respectively by means of clamping bars 3,3' and bolts 4,4' respectively.

With this flexible form of support for the stator the weight of the stator imposes only a static tensile stress on the leaf springs 1, and compressive stress on ribs 5 which lie in the plane of flexure of the leaf springs 1. The transmission of forces from stator 6 to baseplate 7 takes place along the shortest path. There is no danger that the leaf springs, stressed in tension, will buckle; they tolerate large bending deflections in response to torsional vibrations occurring in the stator. The stator can oscillate freely under all operating conditions. Any thermal expansion of the stator is absorbed by the relatively elastic ribs 5.

FIG. 3 shows an application of the resilient mounting of FIGS. 1 and 2 for the case of a horizontal-axis synchronous machine. The spring brackets, the component parts of which have the same reference numbers as in FIGS. 1 and 2, and are located on the lower half of the stator in radial planes symmetrical with the transverse axis of the stator 10. As can be seen from FIG. 4, the spring brackets incorporate a number of springs spaced across the width.

In the case of a vertical-axis machine, as shown in FIG. 5, at least three spring brackets are equally spaced at the lower outer edge of the stator 20, each lying in a radial plane.

With a stator support system whereby forces are transmitted direct from the stator to the baseplate, as in the case of the invention, the weight of the springs, and also their cost, can be significantly reduced. It is furthermore very simple to fit the supports. The reliability of the machine is further improved by the fact that the leaf springs are stressed in tension over their whole width and the corresponding strains therefore remain small.

With horizontal-shaft machines the springing is 1 to 2 orders of magnitude stiffer in all directions, except in the peripheral direction so the stator requires no guide elements. Also, with machines of this kind the top half of the stator is free and can therefore be removed very easily.

This invention is not restricted to single-phase synchronous machines, but can be used with three-phase synchronous machines, where it is also important that in the event of a short circuit the stator can oscillate freely, and therefore the forces occurring have to be absorbed, as is the case particularly with short-circuit generators.

I claim:

1. A support structure for the stator component of a synchronous electrical machine comprising a plurality of spring brackets interconnecting said stator and a base plate, each said spring bracket including one set of parallel spaced stiffening ribs projecting from the stator in the direction towards but terminating short of said base plate in a spring-connecting end and a second set of parallel spaced stiffening ribs projecting from said base plate in the direction towards but terminating short of said stator in a spring-connecting end, and leaf spring means extending in a direction radially of the stator axis and connected respectively at the opposite ends thereof to said spring-connecting ends of said first and second sets of stiffening ribs, said leaf spring means being statically stressed in tension only by the weight of the stator and being subjected to dynamic bending stresses in response to torsional vibrations occurring in the stator during operation of the machine and which are transmitted to said spring means through said stiffening ribs that lie in the plane of flexure of said spring means and also serve to stiffen the spring brackets in the radial and axial directions of said stator component.

2. A support structure as defined in claim 1 for the stator component of a synchronous electrical machine which operates with its rotor shaft in a horizontal attitude and which includes two of said spring brackets extending lengthwise of the stator component that engage the lower half of said stator component at opposite sides of a vertical plane through the stator axis.

3. A support structure as defined in claim 1 for the stator component of a synchronous electrical machine which operates with its rotor shaft in a vertical attitude and which includes at least three of said spring brackets distributed uniformly around the periphery of the lower end face of said stator component by which it is supported.

* * * * *